(12) United States Patent
Aulick et al.

(10) Patent No.: US 7,658,876 B2
(45) Date of Patent: Feb. 9, 2010

(54) METHOD TO FABRICATE A SEAMLESS TUBE

(75) Inventors: Larry Oral Aulick, Cynthiana, KY (US); Jean Marie Massie, Lexington, KY (US); David Allen Tinsley, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 12/028,305

(22) Filed: Feb. 8, 2008

(65) Prior Publication Data

US 2009/0200697 A1    Aug. 13, 2009

(51) Int. Cl.
    *B29D 29/00*      (2006.01)
(52) U.S. Cl. .................. 264/214; 264/215; 264/291; 264/292; 264/313; 264/635; 425/392; 425/393; 425/403; 101/325; 101/350.6; 101/351.1
(58) Field of Classification Search ............. 264/214, 264/215, 291, 292, 313, 635; 425/392, 393, 425/403; 101/325, 350.6, 351.1
See application file for complete search history.

(56) References Cited

U.S. PATENT DOCUMENTS

| 3,037,451 | A | * | 6/1962 | Davis ............... 101/350.6 |
|---|---|---|---|---|
| 3,801,400 | A | * | 4/1974 | Vogt et al. ............. 156/167 |
| 3,933,557 | A | * | 1/1976 | Pall ..................... 156/167 |
| 4,051,284 | A | * | 9/1977 | Ohkubo et al. ........... 428/36.9 |
| 4,938,133 | A | * | 7/1990 | Bock et al. ............. 101/350.6 |
| 4,964,336 | A | * | 10/1990 | Bock et al. ............. 101/157 |
| 5,021,036 | A | * | 6/1991 | Tanaka et al. ........... 474/237 |
| 5,207,960 | A | * | 5/1993 | Moret de Rocheprise ... 264/103 |
| 5,433,913 | A | | 7/1995 | Kawauchi et al. |
| 5,582,886 | A | | 12/1996 | Kitajima et al. |
| 5,608,500 | A | * | 3/1997 | Funabashi et al. ........ 399/176 |
| 6,400,916 | B1 | * | 6/2002 | Go et al. ............... 399/111 |
| 6,500,375 | B1 | | 12/2002 | Aulick et al. |
| 6,818,290 | B1 | * | 11/2004 | Chopra et al. .......... 428/328 |
| 2002/0174830 | A1 | * | 11/2002 | Hanumanthu et al. ..... 118/261 |

* cited by examiner

*Primary Examiner*—Joseph S. Del Sole
*Assistant Examiner*—Timothy Kennedy

(57) ABSTRACT

The present disclosure relates to a process for making a seamless tube from a liquid. A mandrel may be provided having a longitudinal axis, an outer surface and a length. A liquid material may be applied to the outer surface of the mandrel by one or more doctor blades, spaced apart from the mandrel outer surface and inclined at an angle α with respect to the mandrel longitudinal axis, which may be moved along the longitudinal axis of the mandrel while rotating the mandrel around its longitudinal axis. One or a plurality of fingers may overly the mandrel and be positioned upstream of the one or more of blades, relative to the direction of movement of the blades along the longitudinal axis of the mandrel. The liquid material may then be converted to form a seamless tube.

24 Claims, 3 Drawing Sheets

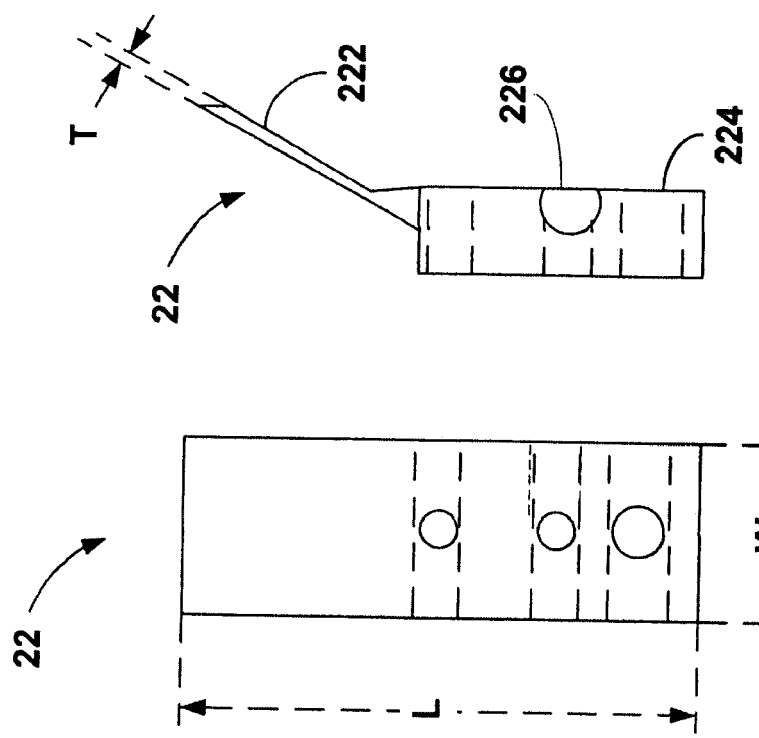
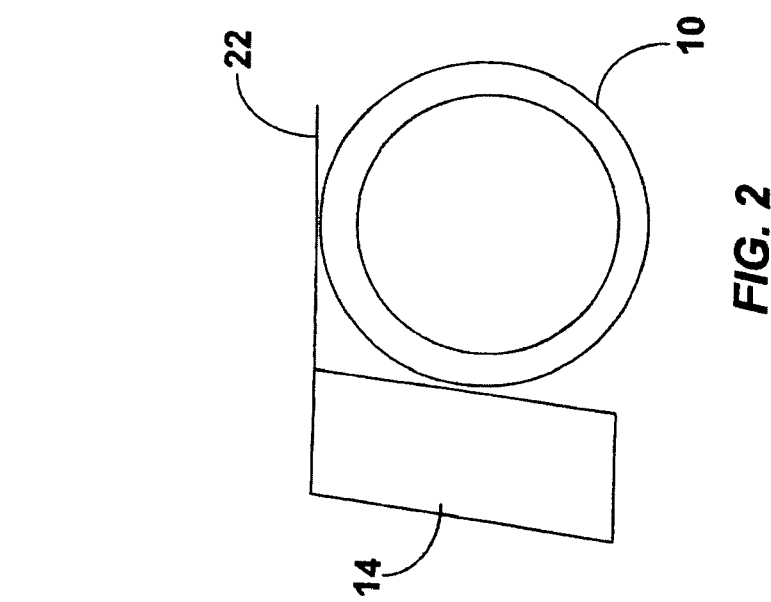

METHOD TO FABRICATE A SEAMLESS TUBE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present disclosure relates to the manufacture of seamless tubes formed from liquids material. In particular, the process may employ one or more doctor blades and associated fingers to apply a coating of the liquid material to the mandrel surface.

2. Description of Related Art

Various methods of coating liquid-like materials onto substrates are well known. These processes may include vertical dip or ring coating; spray coating; and injection molding. These methods may suffer from several disadvantages. Dip or ring coating may require that a large amount of coating solution be generated to coat the part. The part may be submerged into a vat of material and slowly removed. Therefore, excess material may be required and the yield may be quite low. Spray coating also may tend to have a low yield due to the material lost in the overspray. In addition, both dip/ring coating and spray coating may be limited in the material viscosity that can be successfully applied. Spray coating may require a relatively low viscosity in order for the material to be atomized in the spray gun. Dip/ring coating may require higher viscosities to prevent sag of the coating. Methods such as injection molding require sophisticated molds, high pressures and relatively high material viscosities to successfully produce a part.

SUMMARY

An aspect of the present disclosure relates to a process for making a seamless tube from a liquid. The process may include providing a mandrel having a longitudinal axis, an outer surface and a length, providing a liquid material, and providing one or more doctor blades, wherein the doctor blades are spaced from the mandrel outer surface and are inclined at an angle α with respect to the mandrel longitudinal axis. In addition, the liquid material may be applied to the outer surface by one or more doctor blades, which may be moved along the longitudinal axis of the mandrel while rotating the mandrel around its longitudinal axis. The process may also include providing one or a plurality of fingers overlying the mandrel and positioned upstream of the one or more of blades, relative to the direction of movement of the blades along the longitudinal axis of the mandrel. This may then be followed by converting the liquid material to form a seamless tube.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a view from the right end of the mandrel;

FIG. 3a is a front view of an example of a finger;

FIG. 3b is a side view of the finger of FIG. 3a; and

DETAILED DESCRIPTION

Figure 1:
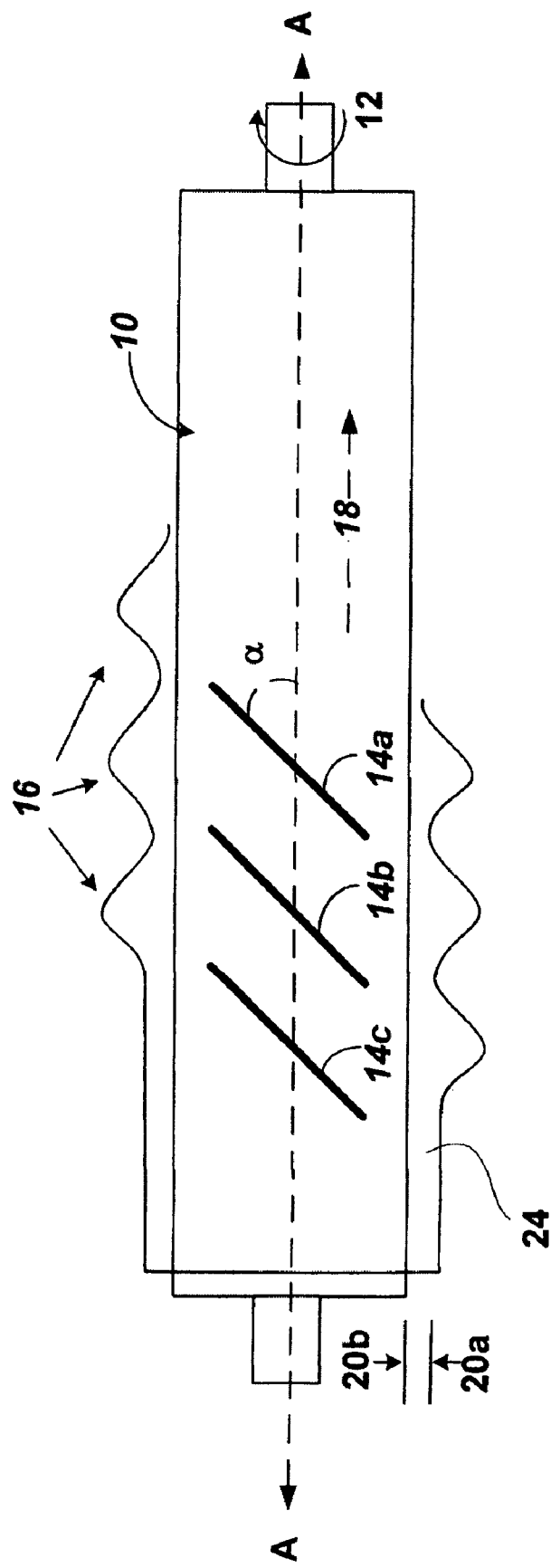
FIG. 1 is a side view of the doctoring action in mid-process.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present disclosure relates to the formation of a seamless tube, which may be utilized in an image forming device such as a printer, copier, fax, all-in-one device, multi-functional device, etc. The seamless tube may also be incorporated into a printer cartridge which may be utilized in an image forming device to provide toner or other functionality thereto. The seamless tube may specifically find application in a heat-fixing member (fuser) in order to fix toner to be developed on selected media. The seamless tube may be formed from a polymeric resin having relatively uniform thickness at a relatively fast manufacturing rate, as disclosed more fully herein. The seamless tube may include one or more layers of material, e.g., one or more layers of the same or different type polymer resins.

The material to be formed into a seamless tube may initially be in liquid form and capable of flowing and subsequently being solidified, for instance by cooling, drying and/or chemical reaction (e.g. a polymerization and/or cross-linking type reaction). The materials, when in liquid form (e.g. by combining a polymer with a given solvent) may have viscosities ($\eta$) between about 10,000 and 300,000 cps (at 10 $sec^{-1}$ shear rate), including all values and increments therein. The % solids of any material mixed with a given solvent may be about 10%-99%, including all values and increments therein. In addition, in certain situations, the material itself, such as a polymer resin or reactive precursor (e.g. monomers and/or oligomers that may react and form relatively higher molecular weigh material) may be present at 100% solids.

With reference to FIG. 1, a mandrel 10 may be rotated in a given direction, such as the direction of arrow 12, while a plurality of doctor blades 14 are moved along the length of the mandrel 10 in the direction of arrow 18 and spaced from the surface of the mandrel consistent with the predetermined thickness which the coated layer is to have. Liquid coating material 16 may be dispensed onto the mandrel in front of each blade forming the illustrated flow fronts as the blades travel down the axis of the mandrel 10 shown generally by arrow 18.

In FIG. 1, three doctor blades 14 (14a, 14b and 14c) are illustrated, including a leading blade and a trailing blade, relative to the direction of movement along the longitudinal axis of the mandrel. The blades 14 may doctor and control the thickness of the liquid material 16 as they travel along the longitudinal axis of the mandrel. The cylindrical mandrel 10 is preferably relatively straight and concentric about its center. Reference to concentric may be understood as having the same center or axis with every surface equidistant from the axis along the length of the mandrel. It is contemplated herein that the concentricity may be less than or equal to about +/−2.5%. For example, for a roller having a 1.0 inch diameter, the variation in concentricity may be about +/−0.025 inches.

The mandrel may be metal or another material that may be capable of withstanding processing temperatures for forming the liquid material into a tube. For instance, the mandrel may be formed from an aluminum cylinder. In addition, the mandrel may be hollow or elliptical. The outer surface of the mandrel may be polished or provided with another surface finish. The surface roughness of a mandrel may be in the range of about 0.1 to 100 μm Ra. The Ra value of surface roughness may be understood as the arithmetic average deviation of the surface valleys and peaks over a given area, otherwise described as the center line average.

The outer surface of the mandrel may also be treated with a release agent, such as silicone dioxide or a fluoropolymer. The release agent may be applied by a sputter coating process or other chemical or physical deposition processes. The release agent coating thicknesses may be in the range of 0.5 to 2 microns.

In coating the mandrel, the mandrel 10 may be rotated at a suitable rate or surface velocity, which may prevent the liquid from sagging and prevent material from being displaced by centrifugal force. For example, the mandrel may be mounted on a lathe (not shown) or similar equipment capable of rotating the mandrel in a direction represented by arrow 12. In one example, a mandrel having a 25-30 mm outer diameter, may be rotated at a rate of about 250 RPM or a surface speed of 19,625 mm/min to 23,500 mm/min. The rate of rotation of the mandrel may be adjusted up or down depending on the outer diameter of the mandrel. It may, therefore, be appreciated that surface speeds in the range of about 10,000 mm/min to 50,000 mm/min, including all values and increments therein may be utilized in the coating process. Furthermore, the surface speeds may be stepped or adjusted as the liquid material forming the belt is applied.

While three doctor blades are illustrated in FIG. 1, one or more doctor blades may be utilized in the process described herein. For example, one may utilize 3, 4 or even 5 blades as applied to a given roller. For example, for thin tubes or coatings of less than about 30 microns in thickness, a single blade may be acceptable. For relatively thicker parts, more than one blade, such as two or three blades may be used. Using only a single blade may result in a relatively large number of trapped air bubbles in the final tube that do not dissipate during the drying/curing process.

The doctor blades may have a thickness in the range of about 0.2 to 5 mm, including all values and increments therein. Doctor blades with flat edges or angled edges for contacting or doctoring the liquid may be used. The doctor blades may be formed of a metal or polymer material and may optionally include a coating. The coating may impart a reduced coefficient of friction to the blade or may form a texture on the blade. For example, a steel blade coated with a thin layer of TEFLON® fluoropolymer may be used. The doctor blades 14 may be individually spaced apart about 1-20 mm including all values and increments therein, although greater spacing is contemplated. It may be appreciated that the spacing between the blades may vary among the blades present or may be constant.

The plurality of blades 14 may also be positioned normal to the axis of rotation of the mandrel as shown in FIGS. 1 and 2 and angled relative to the longitudinal axis A-A of the mandrel at an angle α in the range of 5 to 85 degrees, including all values and increments therein. While the blades are illustrated as being all positioned at the same angle α, it may be appreciated that the blades may be positioned at different angles relative to longitudinal axis A-A. If the blades are perpendicular to the direction of travel (arrow 18), (i.e., α=90 to the longitudinal axis A-A), liquid material 16 may be pushed along the surface of the mandrel 10 until an excess buildup may creep over the blades and cause defects.

With the blades 14 inclined at an angle, built-up liquid material may take the shape of a ring 16 around the mandrel 10. It has now been established that this buildup may be kept relatively flat by the separate use of "fingers" 22 (see FIG. 2) which may also prevent material from being displaced from the mandrel while rotating. The characteristics of the fingers are discussed more fully below. The doctored coating 24 is shown to the left (downstream) of the last blade 14c in FIG. 1 at the desired thickness of liquid coating (20a-20b).

The plurality of blades 14 may be moved along the mandrel 10 parallel to the longitudinal axis of the mandrel in the direction of the arrow 18. The blades may therefore doctor the material onto the mandrel surface to a relatively uniform thickness as illustrated by spaced arrows 20a and 20b. The rate of the blade movement or translational speed in the direction of arrow 18 may be varied across all of the blades or between the individual blades. The individual blades may move at a rate or translational speed of about 2.5 mm/sec or slower, including all values and increments in the range of 0.01 to 2.5 mm/sec. For example, the individual blades may move at a translational speed of 0.15-0.25 mm/sec. Such rate of movement may provide tubes or belts of a relatively uniform thickness and with few entrained air bubbles in the resulting tube.

In addition, the distance between the blades 14 and the surface of the mandrel 10 may adjusted. For example, all of the blades may be a single height from the surface of the mandrel or the heights may vary. Regardless, it may be appreciated that the gap of the trailing blade 14c in the assembly may influence the final coating thickness to a higher degree than the other blades 14a and 14b. In one example, a first (leading) blade gap (to the mandrel surface) of about 0.15 mm, a second blade gap of about 0.33 mm and a trailing blade gap of about 0.54 mm may apply the liquid essentially in three thin layers in one pass. This may eliminate bubbles in the final dried/cured coating. However, it may be appreciated that the gaps may be in the range of 0.01 mm to 5 mm including all values and increments therein.

The distance between the blades and the mandrel surface may also be calculated from a desired thickness of the final coating and the percent solids of the liquid material being applied. In one example, using a liquid solution of approximately 100,000 cps and 17% solids, a coating gap of about 0.54 mm on the trailing blade may produce a dried coating (or tube) thickness of about 50 microns.

If necessary, for thicker parts, the liquid material may be applied in 2 or more passes, with a drying step in between. For example, to produce a 100 micron thick final polyimide part out of a 17% solids polyamic acid, 2 passes may be used. The first pass may apply about ½ of the material. This layer may be dried to eliminate the solvent, then another layer of polyamic acid may be coated on top of the first layer. Once dried, this may produce a tube 100 microns thick.

Each blade may also apply approximately the same amount of the liquid material. In other words, a first blade may be gapped about 0.25 mm, the second blade may be gapped about 0.50 mm, and a third blade may be gaped about 0.75 mm. In addition, if the gap of the third and final blade is too large relative to the gap in the first and/or second blade, and the trailing blade applies more than 50% of the liquid coating placed on the mandrel, the resulting tube may have an unacceptable number of bubbles that may be too large to dissipate easily during the drying/curing process.

Prior to application, the liquid material may be synthesized (melted, mixed, reduced in solids content, etc.), and/or degassed under a vacuum for a period of time until relatively few or no escaping bubbles are seen. The solution may then be supplied to an applicator, which may be dispensed on to the surface of the mandrel 10 in front of each of the blades 14 by a manual or an automatic dispensing system to develop to maintain a relatively consistent small bead (i.e. quantity of coating material) on the mandrel. Therefore, it may be appreciated that the mandrel may be configured to receive one or more streams of coating solution proximate to each blade location, for doctoring (i.e. development of a controlled thickness of the coating as between the blade and the mandrel). Accordingly, enough coating material may be dispensed at one or more of the blade locations to provide an overall continuous coating of a desired thickness for the purpose of forming a seamless tube of a desired thickness.

As noted above, the layer of material 16 may now be maintained as relatively flat by the fingers 22 (see FIG. 2). These fingers may be understood as structural features that may contact and/or apply pressure to the dispensed material 16. In addition, the fingers may be of a relatively consistent shape and size. See FIG. 4. Generally, a finger may be located just upstream (relative to the direction of travel of the blades) of each blade and move with the blades to assist in feeding a bead or quantity of material to each blade.

If the liquid material is not controlled by these fingers, the liquid coating material may undergo excessive build-up and some amount of excess material may fly off the mandrel leaving a spot without coating. This in turn may cause a relatively thin spot or even a hole in the coating, which is now better controlled by the use of the finger components noted herein. These fingers may also "work" the material and help reduce and make smaller any bubbles entrained in the liquid coating. By the term "work", it is meant that the presence of the fingers may apply a pressure to the applied liquid coating to smooth the coating into a more uniform thickness. The pressure may be in the range of 1-10 psi. The fingers may be formed from a polymer material or a metal, such as 0.060" steel, which may be spring loaded or be adjustable to provide a set distance to the surface of the mandrel or to provide a set force against the coated layer of liquid material.

Figure 4:
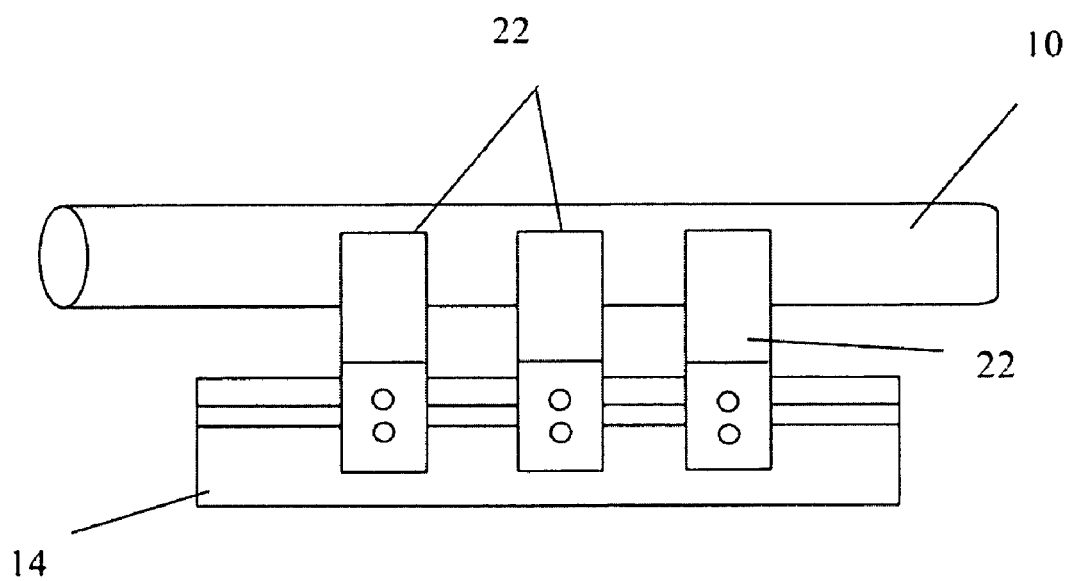
FIG. 4 is a side view of fingers of FIG. 3a and 3b.

As illustrated in FIGS. 3a and 3b, the fingers 22 may have a length (L), a width (W), and a fingertip thickness (T) and a first portion 222 that contacts the liquid coating, and a second portion 224 which may be attached to a fixture by a mechanical method, such as a snap fit or interference fit. In addition, the fingers may include a cut-out portion 226 which when affixed to a support may allow the finger to rotate and be configured to contact the coating liquid. The length may be in the range of 0.5 to 2.0 inches, the width may be in the range of 0.25 to 2 inches and a fingertip thickness of 0.001 to 0.100 inches. Accordingly, as illustrated in FIG. 4. one or more fingers may be positioned upstream of the doctor blades relative to the direction of the movement of the blades and it may be appreciated that the above referenced width W of each individual finger may contact the coating liquid on the surface of the mandrel 10 as described herein.

After applying the liquid material 16 to the mandrel 10 using a plurality of doctor blades 14, the liquid coating may be converted to a seamless tube, which may be achieved by drying and/or curing (reacting in the case of polymer precursors) while rotating until the liquid material may no longer flow or sag. Curing may be facilitated by a number of mechanisms such as heat including IR, UV, visible light, etc. The time and temperature required to do this may be dependent upon the specific materials which comprise the coating material. For example, drying and/or curing may be performed over the course of 10 minutes to 5 or more hours, including all values and increments therein, such as 10 minutes to 10 hours. In addition, drying and/or curing may occur at one or more temperatures over the course of a drying/curing cycle, including temperatures in the range of 20° C. to 400° C., including all values and increments therein. In addition, the temperatures may be adjusted over the course of a drying/curing cycle more than once.

Numerous materials may be used to form the tubes including the following: polyamic acid to form polyimide tubes; particle filled (i.e. boron nitride or carbon black) polyamic acid to form polyimide tubes; and 2 part silicone thermoset elastomers (i.e. a crosslinked polysiloxane). It also is contemplated that many other types of liquid compositions containing a selected polymer or polymer precursor(s) may be utilized with this method and are not limited to those discussed herein. The liquid composition may also include a polymer melt. Accordingly, one may utilize thermoplastic urethanes, thermosetting urethanes, epoxies, polyethylenes, polyamides, polyphenylenesulfide, polyethersulfone, polysulfone, polyamideimide, and derivatives thereof as well as fluororesins selected from the group consisting of polytetrafluoroethylene, tetrafluoroethylene-perfluoroalkylvinylether copolymer and tetrafluoroethylene-hexafluoropropylene copolymer.

The advantages of this process over existing processes may include a relatively high speed of manufacture as a part may be coated in only a few minutes or less. Multiple parts may be coated on the same equipment, for instance by locating them end to end, providing a high yield. The claimed process may provide tubes having a relatively high thickness uniformity and tolerance that may be in the range of +/−1% to +/−10% of the coating thickness. In one specific example, tubes were made having a thickness of 50 microns with a standard deviation on less than +/−2 microns, using a 25 mm diameter mandrel that was rated for a concentricity tolerance of 0.38 mm. Accordingly, it is contemplated herein that tubes may be prepared having a thickness of 10-100 microns in thickness, wherein the deviation in thickness may be +/−10% or less. For example, the deviation in thickness may be +/−5%, +/−4%, +/−3%, etc.

By the use of the doctor blade/finger combination noted herein, it has been found that a controlled and more precise amount of coating solution may be applied to the mandrel surface to provide a seamless tube. For example, for a given quantity of coating solution, suitable to provide a desired thickness seamless tube, over 95% of the solution is applied to the mandrel, and 5% or less of the solution amounts to waste. This compares favorably to vertical dip and/or ring coating or even spray procedures where more than 5% of the coating solution may be wasted. Reference to waste coating solution may be understood as coating solution that does not remain on the mandrel and is otherwise not utilized during the particular seamless tube formation.

The following examples, are intended to be illustrative only, as numerous modifications and variations therein will be apparent to those skilled in the art.

EXAMPLE 1

A polyamic acid solution filled with boron nitride, in n-methyl pyrrolidone solvent at 17% solids, was applied using the above-described method. The solution was applied to a 25.4 mm outer diameter aluminum mandrel. The aluminum mandrel had been coated with a release agent to allow the final part to be removed from the mandrel without sticking. The mandrel was rotated at 250 RPM using a three blade assembly with a translation speed of about 0.15 mm/sec. The gaps between each of the 3 blades and the mandrel were 0.25 mm/0.38 mm/0.56 mm respectively. The coating solution was dispensed periodically in front of each blade to maintain a constant bead. After applying the polyamic acid solution, the coated mandrel was removed and transferred to an oven for evaporation of the solvent. The evaporation conditions were 30 minutes at 60° C., followed by 30 minutes at 125° C. The mandrel was continuously rotated while drying to prevent sag and running of the wet coating. Once dry, the mandrel was placed in a higher temperature oven for the imidization process. This process converts the polyamic acid into a polyimide. The conditions were 30 minutes at 200° C., followed by 80 min at 250° C., followed by 60 minutes at 380° C.

Upon final cure of the polymide, the mandrel was removed from the oven and allowed to cool to room temperature. Because of the difference in thermal expansion between the aluminum mandrel and the polyimide, a small gap existed between the mandrel outer surface and the polyimide inner surface. Therefore, removal of the tube became a matter of simply sliding the tube off the mandrel. This process resulted in a 50 micron thick polyimide tube, with a thickness standard deviation of less than +/−2 microns.

EXAMPLE 2

A substrate, for instance, a stainless steel or a polyimide seamless tube, such as formed in Example 1 above, may be coated with a material such as silicone using the above-described method. The polyimide seamless tube formed in Example 1 was slipped over a 25.4 mm diameter mandrel for support during the coating process. The mandrel was placed on a coater and the tube coated with a two part silicone. The silicone used was Shin Etsu X34-2744. Parts A and B of the 2 part silicone were premixed before dispensing. The mixture was dispensed onto the tube covering the mandrel, with the mandrel rotating at 250 RPM, using a blade translation speed of 0.15 mm/sec. A 2 blade assembly was used with gaps set at 0.25 mm/0.56 mm. Only 2 blades were necessary in this case, because this silicone material was not as susceptible to bubble formation during the coating process. After the tube was coated, it was cured at 100° C. for 60 minutes, followed by postcuring at 200° C. for 4 hours. This coating process provided a 2 layer tube of silicone coated on top of polyimide. Using the aforementioned blade gaps, a final silicone coating thickness of about 300 microns was obtained.

The foregoing description of several method and embodiments of the disclosure have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A process for making a seamless tube from a liquid, comprising:
providing a mandrel having a longitudinal axis, an outer surface and a length;
providing a liquid material;
providing one or more doctor blades, wherein said one or more doctor blades are spaced from said mandrel outer surface and are inclined at an angle α with respect to said mandrel longitudinal axis;
applying said liquid to said outer surface and moving said one or more doctor blades along said longitudinal axis of said mandrel while rotating said mandrel around its longitudinal axis;
providing one or more fingers overlying said mandrel and positioned upstream of said one or more of blades, relative to the direction of movement of said blades along the longitudinal axis of said mandrel, and moving the fingers with the one or more doctor blades to assist feeding of said liquid thereto; and
converting said liquid material to form a seamless tube.

2. The process of claim 1 wherein said liquid material has a viscosity of between about 10,000 and 300,000 cps at a 10 $sec^{-1}$ shear rate.

3. The process of claim 1 wherein the surface of said mandrel is coated with a material to aid in removal of said seamless tube from said mandrel.

4. The process of claim 1 wherein said liquid material includes one or more of the following polymers: polyimide, polysiloxane, thermosetting and thermoplastic urethanes, epoxies, polyethvlenes, polyamides, polyethylenes, polyphenylenesulfide, polyethersulfone, polysulfone, polyamideimide and fluororesins.

5. The process of claim 1 wherein each of said one or more doctor blades is spaced a different distance from said outer surface of said mandrel.

6. The process of claim 5 wherein said one or more doctor blades includes a leading blade and a trailing blade and the distance from said leading blade to said mandrel is less than the distance from said trailing blade to said mandrel, wherein less than 50% of said liquid material applied to said mandrel is applied by said trailing doctor blade.

7. The process of claim 1 wherein said angle α is 5-85 degrees relative to said longitudinal axis.

8. The process of claim 1 wherein said one or more fingers provide a pressure of 1-10 psi to said liquid material on said outer surface.

9. The process of claim 1 wherein said seamless tube has a thickness and said thickness does not vary by more than +/−10%.

10. The process of claim 1 wherein said tube has a thickness of 10-100microns.

11. The process of claim 1 wherein said mandrel is rotating at a surface speed of 10,000 mm/min to 50,000 mm/min.

12. The process of claim 1 wherein moving said one or more doctor blades along said longitudinal axis of said mandrel is at a speed of less than or equal to 2.5 mm/sec.

13. A process for making a seamless tube from a liquid, comprising:
providing a mandrel having a longitudinal axis, an outer surface and a length;
providing a liquid material;
providing a plurality of doctor blades, wherein said doctor blades are spaced from said mandrel outer surface and are inclined at an angle α with respect to said mandrel longitudinal axis, wherein said angle α is 5-85 degrees relative to said longitudinal axis;

applying said liquid to said outer surface and moving said doctor blades along said longitudinal axis of said mandrel while rotating said mandrel around its longitudinal axis;

providing a plurality of fingers overlying said mandrel and positioned upstream of said doctor blades, relative to the direction of movement of said blades along the longitudinal axis of said mandrel, and moving the fingers with the doctor blades along the longitudinal axis of the mandrel, wherein said one or more fingers provides a pressure of 1-10 psi to said liquid material on said outer surface; and converting said liquid material to form a seamless tube.

14. The process of claim 13 wherein each of said doctor blades are spaced a different distance from said outer surface of said mandrel.

15. The process of claim 13 wherein said seamless tube has a thickness and said thickness does not vary by more than +/−10%.

16. The process of claim 1 wherein the one or a plurality of fingers move parallel to the longitudinal axis of the mandrel along with the doctor blades.

17. The process of claim 13 wherein the plurality of fingers move parallel to the longitudinal axis of the mandrel along with the doctor blades.

18. The process of claim 1, wherein each finger includes a substantially planar surface for contacting said liquid, and the process further comprises orienting the one or more fingers relative to a surface of the one or more doctor blades so that the planar surface is positioned about 90 degrees relative to a surface of the one or more doctor blades which contacts said liquid.

19. A tube forming apparatus, comprising:

a mandrel having a longitudinal axis, an outer surface and a length, the mandrel being selectively rotated about the longitudinal axis;

one or more blades spaced from the outer surface of the mandrel and disposed at an angle with respect to the longitudinal axis of the mandrel, the one or more blades being selectively movable in a direction along the longitudinal axis of the mandrel so as to control a thickness of a formable material dispensed on the mandrel during tube forming operation; and one or more fingers being upstream of the one or more blades and movable therewith so as to assist in feeding the formable material to the one or more blades, each finger including a substantially planar surface for contacting the formable material.

20. The apparatus of claim 19, wherein the one or more fingers comprise a plurality of fingers, at least one finger being disposed forwardly of the one or more blades relative to a movable direction thereof.

21. The apparatus of claim 19, wherein each finger includes a portion for attachment relative to the one or more blades.

22. The apparatus of claim 19, wherein the planar surface of the finger is disposed at about 90 degrees relative to a surface of the one or more blades that is adjacent the mandrel.

23. The apparatus of claim 19, wherein the one or more blades and the one or more fingers move in a substantially linear direction substantially parallel to the longitudinal axis of the mandrel.

24. The apparatus of claim 19, wherein the one or more blades comprises a plurality of blades, each blade having a longitudinal axis that is substantially parallel to each other.

* * * * *